(12) United States Patent
Trangsrud

(10) Patent No.: US 6,899,310 B1
(45) Date of Patent: May 31, 2005

(54) CAGE SPACER

(76) Inventor: Julian P. Trangsrud, 300 Cherry St., Northfield, MN (US) 55057

( * ) Notice: Subject to any disclaimer, the term of this patent is extended or adjusted under 35 U.S.C. 154(b) by 27 days.

(21) Appl. No.: 10/417,636

(22) Filed: Apr. 17, 2003

(51) Int. Cl.[7] .............................................. A47G 1/10
(52) U.S. Cl. .................................. 248/316.7; 248/68.1
(58) Field of Search ......................... 248/316.8, 316.7, 248/68.1, 74.2, 74.5, 491, 229.26, 229.16; 52/687, 684, 688, 689, 655.1, 665; 24/900.1, 24/3.11, 3.12, 56, 66.13

(56) References Cited

U.S. PATENT DOCUMENTS

| | | | | |
|---|---|---|---|---|
| 1,084,966 | A | * 1/1914 | Rodes | ......................... 248/404 |
| 3,257,767 | A | 6/1966 | Lassy | ............................ 52/652 |
| 3,471,986 | A | * 10/1969 | Swenson | .................... 52/649.8 |
| 3,600,764 | A | * 8/1971 | Froehlich | ..................... 24/545 |
| 4,063,397 | A | * 12/1977 | Follows | ........................ 52/684 |
| 4,159,605 | A | * 7/1979 | Ilukowicz | .................... 52/687 |
| 4,168,423 | A | * 9/1979 | Gilreath | ...................... 219/402 |
| 4,301,638 | A | 11/1981 | Schmidgall | .................. 52/687 |
| 4,835,934 | A | 6/1989 | Swenson | ..................... 52/687 |
| 4,989,388 | A | * 2/1991 | Schmidgall et al. | ......... 52/687 |
| 5,987,714 | A | * 11/1999 | Smith | .......................... 24/295 |

OTHER PUBLICATIONS

Strike Tool, Strike Products, Why Plastic Over Metal, Aug. 1, 2002, www.striketool.com/pyramid.html.
Eagle Eye Products, Inc., Eagle Eye Products: Mesh Spacers, (2pp.).

* cited by examiner

Primary Examiner—Anita King
Assistant Examiner—Amy J. Sterling
(74) Attorney, Agent, or Firm—Nikolai & Mersereau, P.A.

(57) ABSTRACT

A cage spacer for spacing reinforcing rods or welded fabric a specified distance from mold walls for poring concrete during construction projects. The cage spacer comprises two intersection legs in a V shape. The legs each have a clip portion for engaging and capturing the rods or welded fabric such that the cage spacers are oriented this their apex in a plane parallel to the plane of the face of the rods and the face of a mold. The clips are oriented perpendicular to the plane of the face of the rods or welded fabric such that the clips are attached by applying a force perpendicular to the plane of the rods. A pointed apex on the top of the cage spacer reduced the footprint of the cage spacer on the wall of the mold for a stronger wall when the molded concrete is formed.

2 Claims, 2 Drawing Sheets

CAGE SPACER

BACKGROUND OF THE INVENTION

1. Field of the Invention

This invention relates to clip on spacers for rebars or welded fabric used in structures to space the rebars or welded fabric a specified distance from concrete mold walls.

2. Description of the Related Art

In the past concrete rebars or welded fabric have been held in place relative to walls by a variety of spacers. Some of the spacers have V shapes with clips on each leg to attach the spacers to the rebars or welded fabric. However the angles of the clips to the body of the V shaped spacer and the nature of the clips made the spacers hard to apply to the rebars and did not insure that the spacers would remain on the rebars or welded fabrics or stay properly aligned to the wall when attached to the rebar or welded fabric.

The V shaped spacers have been make out of wires, sheets of metal and plastic which have different stiffnesses impeding the installation of the clip on the rebars or welded fabric. It is desired to have a clip portion that is easy to install by pressing the V shaped spacer perpendicularly to the plane of the rebars or welded fabric with respect to the wall and having the clip portion snap onto and lock on the rebars or welded fabric.

Some spacers have clip on connections, which can come loose during impacts received during the construction process. It is desired to have clips that will stay connected once installed on the rebars or welded fabric.

Other spacers have clips, which are difficult to install on the rebars of welded fabrics.

Strike Tool 31785 64$^{th}$ Ave., Cannon Falls, Minn. 55009, has a V shaped spacer with a C-shaped clip-on portion for engaging rebars or welded fabric. The angle of the C shaped clip on portion is such that the spacer may be hard to install on the rebar or welded fabric. The spacer may also come off the rebars or welded fabric at undesired times.

SUMMARY OF THE INVENTION

A V shaped spacer which clips onto a rebar or welded fabric. The V shaped spacer has two legs, which meet at an apex which engages a mold wall. Preferably the apex has a pointed roof for a minimal footprint on the mold wall. The clips on the V shaped spacers have a C shaped cylindrical engaging portion for engaging and holding rebar or welded fabrics. The clips have a pair of arms to engage the cylinder and hold it from escaping from the C shaped cylinder engaging portion. The V shaped spacer is easy to apply to the rebars or welded fabric, will not come off once installed and align the apex of the V shaped spacer perpendicular to the mold wall.

OBJECTS OF THE INVENTION

It is an object of the invention to provide a spacer for spacing rebars or welded fabric a specified distance from molds.

It is an object of the invention to provide a spacer that will not come off of the rebars or welded fabric once installed.

It is an object of the invention to provide a small footprint of the spacer at the mold wall.

It is an object of the invention to provide spacers with clips that are easy to install.

It is an object of the invention to provide spacers which will remain in place on the rebar or welded fabric to properly space the rebar or welded fabric from the mold wall.

It is an object of the invention to provide an inexpensive, reliable and durable spacer.

It is an object of the invention to align the apex of the spacer with the plane of the mold wall.

Other objects, advantages and novel features of the present invention will become apparent from the following description of the preferred embodiments when considered in conjunction with the accompanying drawings.

DESCRIPTION OF THE PREFERRED EMBODIMENTS

Figure 1:
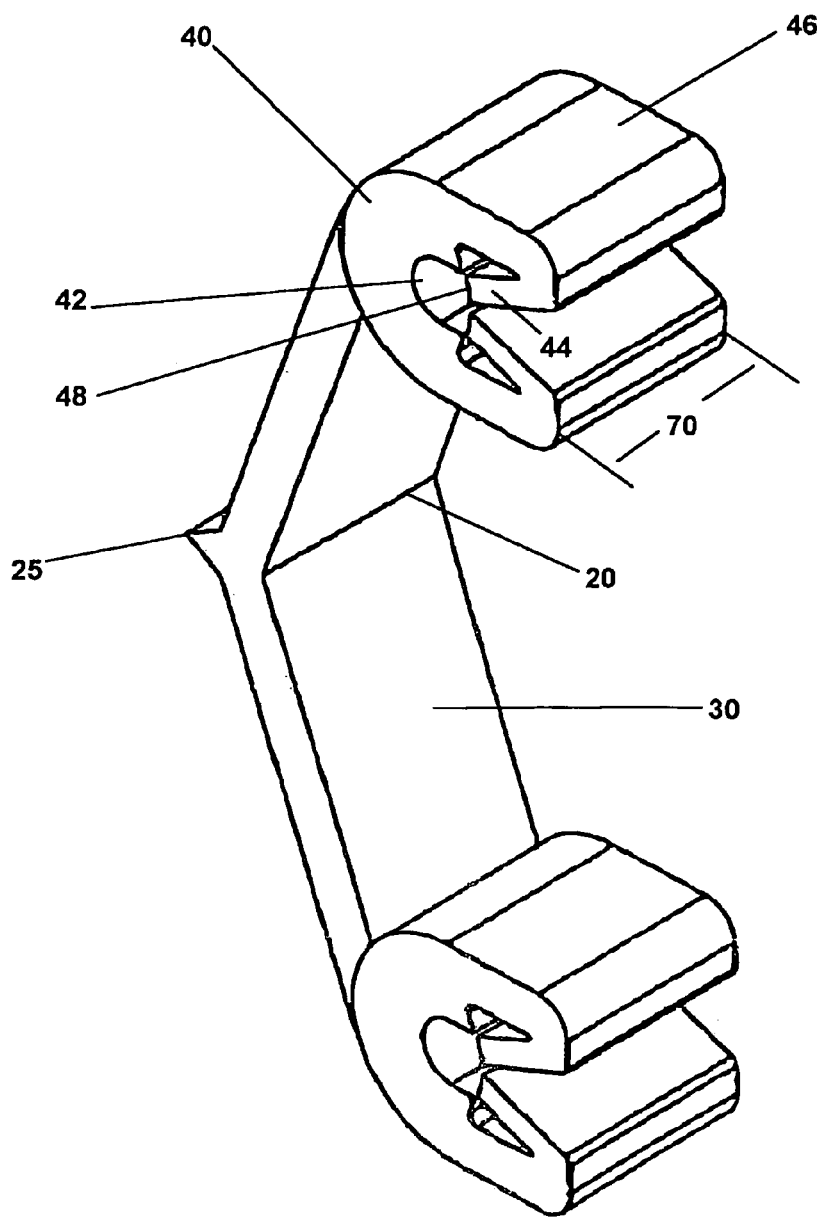
FIG. 1 is an angled perspective view of the V shaped cage spacer with a downward facing clip.
Figure 2:
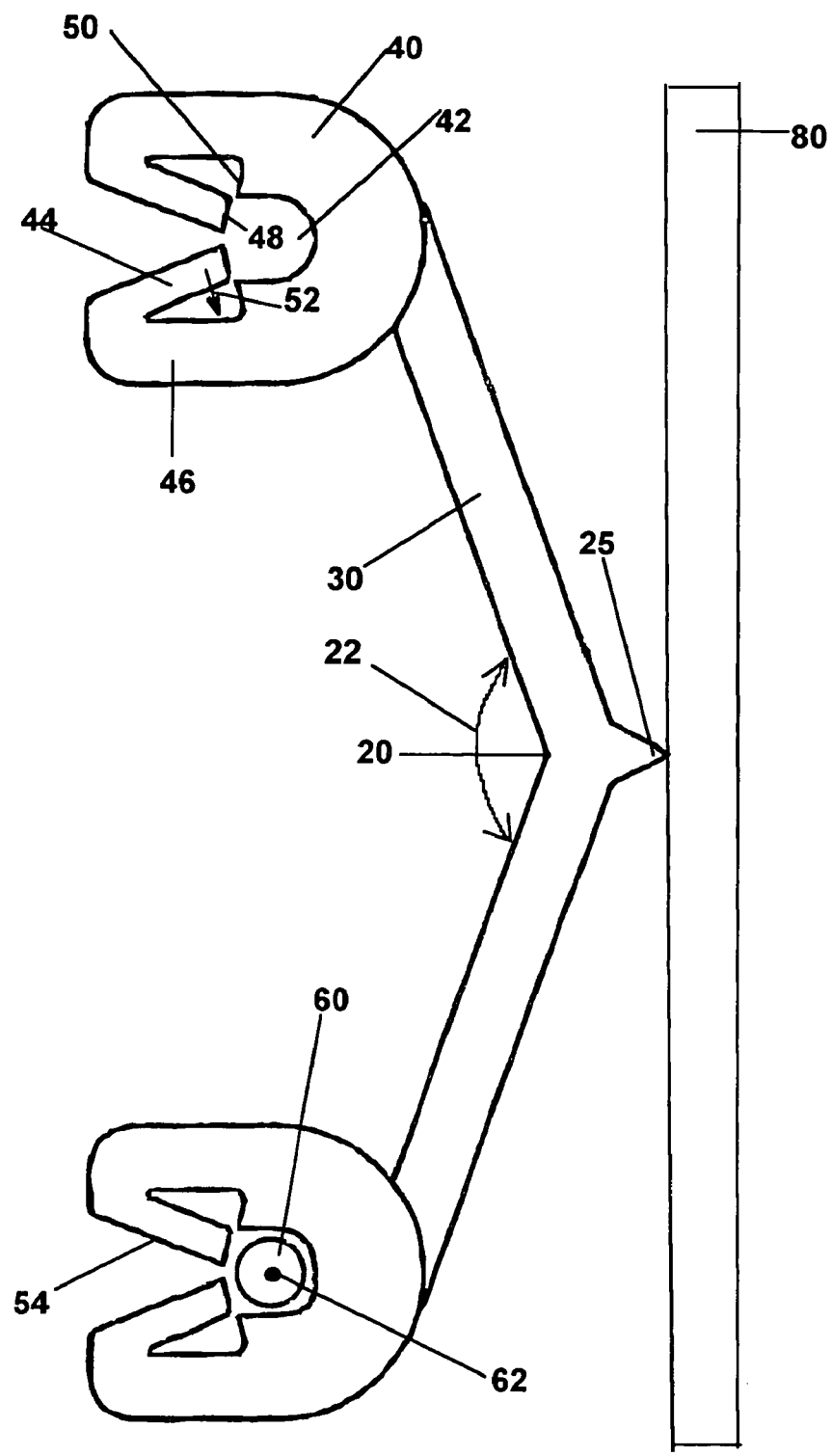
FIG. 2 is a side view of the V shaped cage spacer with a downward facing clip.

The V shaped cage spacer 10 has a pair of legs 30, which meet at a junction 20 and support spaced apart clip portions 40. The junction 20 preferably has a pointed apex 25 having a small footprint for engaging a mold wall.

The angle 22 at the junction 20 and length of the legs 30 determine the distance of the tip of the apex 25 from the rebar or welded fabric 60, thus spacing a mold wall a specified distance from the plane formed by the rebar or welded fabric 60. The length of the legs 30 and the angle 22 also determine how far apart the clips 40 are from each other so that they can be lined up with and attach to rerods or welded fabric.

The angles 22 and leg lengths 30 can be varied for any desired spacing between a mold wall and the rebars or welded fabric. It is important to have the spacers hold the rebars or welded fabric a specified distance from the mold wall to ensure proper reinforcing strength in concrete provided by the rebars or welded fabric.

Clip 40 has a cylinder engaging C shaped portion 42 for engaging cylindrical rerods or welded fabrics 60. Clip 40 also has two parallel arm supporting segments 46 extend outward from the open face of the C shaped portion 42, and two angled arms 44 angling radially inward from the arm supporting segments 46 toward the axis 62 of the cylindrical rerods or welded fabric 60 near the center of C shaped portion 42. Clip 40 is placed on the rebar or welded fabric 60 by forcing the walls 54 on angled arms 44 apart, as shown by arrow 52, until the rebar or welded fabric 60 rests in the rebar engaging portion 42. Then the angled arms 44 are able to spring back to their unstressed position. When the rebar or welded fabric 60 is enclosed in the C shaped portion 42 it can not escape. The angled arms 44 are designed to have their ends 48 engage the cylinder 60 of the rebar or fabric of the welded fabric at angles such that the rebar or fabric of the welded fabric is held snugly in the recess of the C shaped portion 42 with the ends 48 of angled arms 44 blocking the escape of the rebars or welded fabric by engaging the rebars' or fabrics' circumference.

In a preferred embodiment the angled arms are pushed aside into a recess along shoulder wall 50 so as to allow the rebars or welded fabric 60 into the C shaped portion 42 before the angled arms 44 snap back into place.

As shown in FIG. 1 the cage spacer 10 is shown with apex tip 25 against mold wall 80. The cage spacer is oriented with the clips vertically. The mold wall 80 can't push the spacer backward because the C shaped portion 42 secures the rebar or welded fabric 60 against the inside of the C part of the wall. The distance between the rebar or welded fabric 60 and the mold wall 80 is thus uniform along the entire length of the mold wall 80.

The nature of the clip 40 allows the clip to be applied to the rebar or welded fabric 60 easily and the angled arms 44 prevent the clips from coming off the rebars or welded fabric 60.

The apex 25 is aligned along its length against wall 80 because the width 70 of the clips along rebars or welded fabric 60 align the clips to the wall.

The apex 25 need not be a pointed roof type as shown. Other designs such as spaced apart small posts or thin walls may be used.

Further the cross section of the legs 30 need not be rectangular or of uniform width. The V shape may be replaced by U shapes or other shaped legs.

Obviously, many modifications and variations of the present invention are possible in light of the above teachings. It is therefore to be understood that, within the scope of the appended claims, the invention may be practiced otherwise than as specifically described.

What is claimed is:

1. A cage spacer comprising:
   a pair of legs each leg having a first end and a second end, the legs integrally joined at the first ends to form a V shaped body having a linear apex at the conjunction of the legs,
   a pointed roof extending along the linear apex, the pointed roof having an apex spaced from the linear apex and along the line formed by the linear apex for limiting a footprint of contact between the cage spacer and a mold wall,
   a clip member integrally attached at the second end of the legs for attaching the cage spacer to cylindrical objects, the clip member having,
   a C shaped receiving portion having a trough with a first C shaped end and a second C shaped end defining the length of the trough, the length of the trough aligned parallel to the linear apex for receiving the cylindrical objects, the C shaped receiving portion trough having a curved surface portion with a circular cross section perpendicular the trough length for engaging approximately half of the circumference of the cylindrical object to hold it securely in the clip,
   a pair of parallel arms integral with the C shaped receiving portion and extending beyond the cylindrical object,
   a radially extending arm at an acute angle from and integral with each parallel arm, extending toward the center of the C shaped receiving portion such that the radially extending arms are pushed aside to allow the cylindrical object into the C shaped receiving portion and then returning to their relaxed positions to hold the cylindrical object in place.

2. A cage spacer as in claim 1 wherein, the C shaped receiving portions have a shoulder for allowing the radially extending arm to be detented adjacent thereto when pushing the cylindrical objects into the C shaped receiving portion.

* * * * *